United States Patent
Wada

[11] Patent Number: 6,134,026
[45] Date of Patent: Oct. 17, 2000

[54] DATA READING APPARATUS AND METHOD

[75] Inventor: Toshihide Wada, Yokohama, Japan

[73] Assignee: Canon Kabushiki Kaisha, Tokyo, Japan

[21] Appl. No.: 09/053,505

[22] Filed: Apr. 1, 1998

[30] Foreign Application Priority Data

Apr. 11, 1997 [JP] Japan ................................. 9-093926

[51] Int. Cl.$^7$ .................................................. H04N 1/40
[52] U.S. Cl. ............................................................ 358/461
[58] Field of Search .................................... 358/461, 497, 358/498, 496, 494, 474; 382/274

[56] References Cited

U.S. PATENT DOCUMENTS

| | | | |
|---|---|---|---|
| 5,099,341 | 3/1992 | Nosaki et al. | 358/461 |
| 5,146,351 | 9/1992 | Maehara | 358/461 |
| 5,153,738 | 10/1992 | Stemmle | 358/497 |
| 5,162,916 | 11/1992 | Stemmle et al. | 358/498 |
| 5,202,773 | 4/1993 | Kato | 358/461 |
| 5,214,520 | 5/1993 | Miyazawa | 358/461 |
| 5,282,060 | 1/1994 | Kizu et al. | 358/461 |
| 5,317,421 | 5/1994 | Ito | 358/461 |
| 5,537,219 | 7/1996 | Morikawa et al. | 358/406 |
| 5,734,758 | 3/1998 | Yamamoto et al. | 382/274 |
| 5,802,217 | 9/1998 | Suzuki et al. | 382/274 |

*Primary Examiner*—Jerome Grant, II
*Attorney, Agent, or Firm*—Morgan & Finnegan LLP

[57] ABSTRACT

White reference data can be read regardless of where a white reference sheet traverses an area traversed by a document. This is accomplished by setting the amount A of movement of a carrier, which is for necessary for entering the white reference data, so as to satisfy the condition:

$$D > A \geq D - C + B$$

where B represents amount of movement necessary for the carrier, which mounts a scanner head, to read one item of white reference data, C represents the width of the white reference sheet in the carrier traveling direction, and D represents the width within which the document can be placed.

10 Claims, 7 Drawing Sheets

6,134,026

DATA READING APPARATUS AND METHOD

BACKGROUND OF THE INVENTION

This invention relates to an apparatus and method for reading data. More particularly, the invention relates to the reading of white reference data in an apparatus capable of performing printing and document reading in selective fashion.

An ink-jet recording apparatus capable of being used as a scanner by detaching the printing head from a carrier and mounting instead a scanner head having substantially the same shape as that of the printing head so that documents can be optically read has not yet been proposed. The only similar example of such use available is a thermal transfer recording apparatus in which the ribbon cassette is replaced by a scanner cartridge.

In the case where a scanner head is mounted on the carrier in an ink-jet recording apparatus so that the apparatus may be used as a scanner, a white reference data is necessary as a reference for the amount of reading light required by the scanner head. The white reference data is required in order to compensate for individual differences among scanner heads and the ink-jet recorders with which they are combined, aging of the LED used as the light source for illuminating documents, a decline in quantity of light caused by environmental conditions, and differences from one light-receiving sensor to the next. It has been contemplated to obtain the white reference data by a white reference sheet utilizing the paper supply mechanism of the ink-jet recording apparatus. In order to prevent the white reference sheet from becoming soiled by the effects of printing error or ink mist at the time of printing, the white reference sheet is not installed in the printing space. Rather, the white reference sheet is supplied in the same manner as a document in the path traversed by the recording paper of the ink-jet recording apparatus or by the read document, then the carrier is moved to a predetermined position above the white reference sheet, the white reference sheet is read and the read value is adopted as the white reference of the read document. This method is advantageous in that error is small because when the white reference sheet is read, the position occupied by the reference sheet in the apparatus is the same as that of the actual document when the document is read.

With the above-described method, however, the user must make sure that the white reference sheet always traverses the same position. This is a troublesome operation.

SUMMARY OF THE INVENTION

An object of the present invention is to provide a data reading apparatus and method which make it possible to read a white reference sheet regardless of where the white reference sheet is supplied in the paper supply passageway in printing space.

According to the present invention, the foregoing object is attained by providing a data reading apparatus comprising: carrier means for mounting a scanner head which optically reads a document, the carrier means being provided so as to be capable of moving back and forth relative to the document in a first direction; transport means for transporting the document and the scanner head in a second direction relatively that is perpendicular to the first direction; and control means for controlling movement of the carrier means in such a manner that an amount (A) of movement of the carrier means will satisfy the following condition:

$$D > A \geq D - C + B$$

when a reference document is read by the scanner head, where B represents amount of movement of the carrier means required for the scanner head to read one item of reference data, C represents width of the reference document in the first direction, and D represents a width within which an original document can be placed.

Further, according to the present invention, the foregoing object is attained by providing a method of reading data in a data reading apparatus having carrier means for mounting a scanner head which optically reads a document, the carrier means being provided so as to be capable of moving back and forth relative to the document in a first direction, and transport means for transporting the document and the scanner head in a second direction relatively that is perpendicular to the first direction, the method comprising a step of controlling movement of the carrier means in such a manner that an amount (A) of movement of the carrier means will satisfy the following condition:

$$D > A \geq D - C + B$$

when a reference document is read by the scanner head, where B represents amount of movement of the carrier means required for the scanner head to read one item of reference data, C represents width of the reference document in the first direction, and D represents a width within which an original document can be placed.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which following the description for determining the scope of the invention.

DESCRIPTION OF THE PREFERRED EMBODIMENT

A preferred embodiment of the present invention will be described in detail with reference to the accompanying drawings.

Figure 3:
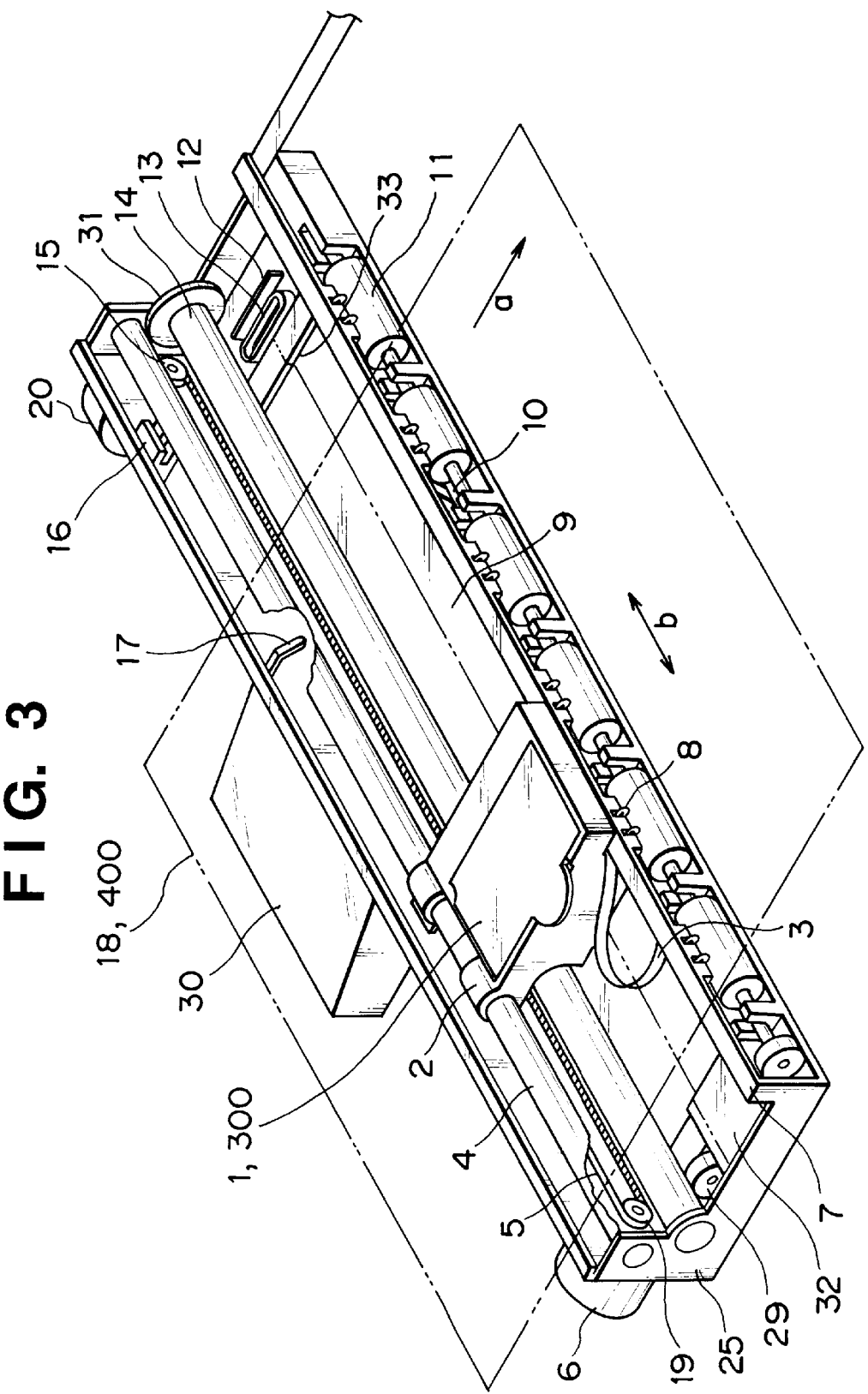
FIG. 3 is a perspective view showing a data reading apparatus according to the embodiment of the present invention.
Figure 4:
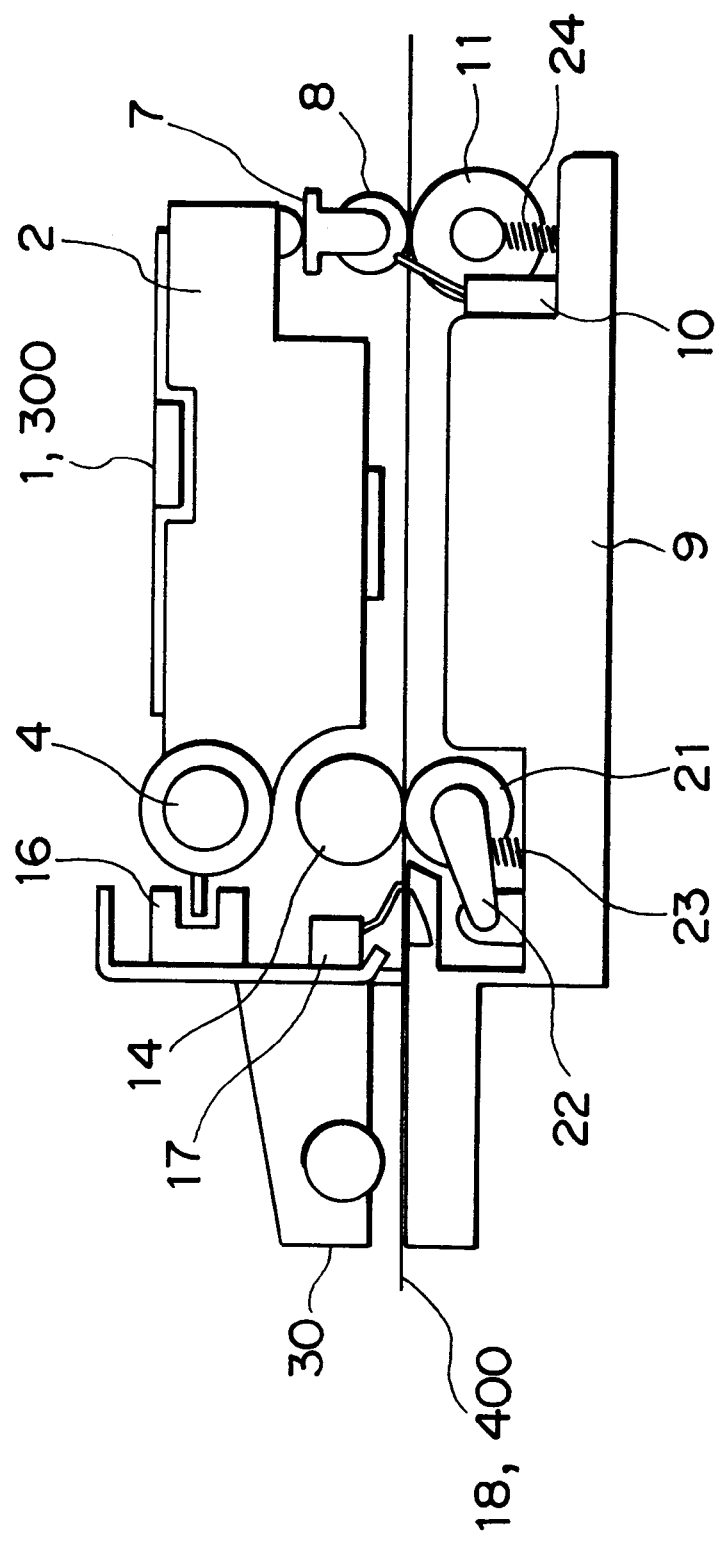
FIG. 4 is a side section of FIG. 3.

As shown in FIGS. 3 and 4, a data reading apparatus according to this embodiment of the present invention includes a carrier 2 holding either a printing head 1 or a scanner head 300 in a freely attachable and detachable manner. The carrier 2 is supported on a guide shaft 4 and guide rail 7, which are fixed at both their ends to a frame 25 so to lie parallel to each other. The carrier 2 is moved back and forth is freely slidable fashion in a direction perpendicular to the direction (indicated by arrow a and referred to as the sub-scan direction or second direction) in which a sheet of printing paper or a document 18 or a white reference sheet 400 is transported and in a direction (indicated by arrow b and referred to as the main-scan direction or first direction) parallel to the plane of the sheet of printing paper or document 18 or of the white reference sheet 400.

The carrier 2 is coupled to part of a belt 5 wound around a driving pulley 30, which is rotatively driven by a carrier motor 6 via a gear train (not shown), and an idle pulley 15 freely rotatably supported on the frame 25. When the pulley motor 6 is driven, so is the belt 5, thereby making it possible to move the carrier 2 back and forth in the directions of arrow b.

A position sensor 16 determines whether the carrier 2 is at a home position by sensing passage of the carrier 2. A flexible cable 3 transmits various control signals from a control circuit board (not shown) to the printing head 1 or scanner head 300.

A method of transporting the printing paper, document 18 or white reference sheet 400 will now be described.

An automatic paper supply unit 19 separates plural sheets of set printing paper, documents 18 or white reference sheets 400 into individual sheets one at a time and transports them toward a paper feed roller 14, which is freely rotatably supported on the frame 25. An LF gear 31 is secured to the paper feed roller 14 and is rotatively driven by a paper feed motor 20 via a gear drain, which is not shown. A pinch roller 21, which is supported on a pinch roller holder 22 and biased by a pinch roller spring 23, is in pressured contact with the paper feed roller 14. The sheet of printing paper or document 18 or the white reference sheet 400 is clamped between the paper feed roller 14 and pinch roller 21 and is transported in the direction of arrow a by driving the paper feed motor 20. The sheet of printing paper or document 18 or the white reference sheet 400 is transported in the direction of arrow a while its width is regulated by guides 32, 33 provided on a platen 9.

A paper discharge roller 11 is for discharging the sheet of printing paper, on which printing has been completed, or the document 18 or the white reference sheet 400. A driving force is transmitted to the paper discharge roller 11 from the paper feed roller 14 via an idle gear train 29, whereby the paper discharge roller 11 is rotated in unison with the paper feed roller 14. Spurs 8 are in pressured contact with the paper discharge roller 11. The sheet of printing paper or document 18 or the white reference sheet 400 is transported while being clamped between the spurs 8 and the paper discharge roller 11.

A paper sensor 17 senses the presence of the sheet of printing paper or document 18 or the white reference sheet 400 immediately before it reaches the paper feed roller 14. A paper discharge sensor 10 senses the presence of the sheet of printing paper or document 18 or the white reference sheet 400 in the vicinity of the paper discharge roller 11.

[Printer Function]

The data reading apparatus of this embodiment will be described in terms of the function of a printer.

The printing head 1 performs printing on the printing paper 18 line by line by jetting ink downward in FIG. 4, in conformity with an image recording signal, in synchronization with the back-and-forth travel of the carrier 2. The printing head 1 is equipped with very small ink jetting ports referred to as orifices, an ink supply path, an energy application section provided in part of the ink supply path, and an energy generating section for generating droplet forming energy that acts upon the ink situated in the energy application section.

Methods that can be applied as recording methods using this energy generating section include a recording method using an electromechanical transducer such as a piezoelectric device, a recording method using an energy generating section for producing heat by irradiation with electromagnetic waves such as of a laser and jetting ink droplets by the action of the generated heat, and a recording method using an energy generating section for heating and jetting ink by an electrothermal transducer such as a heating element having a heating resistor.

Recording heads used in the ink-jet recording method that jets ink by thermal energy are capable of performing high-resolution recording owing to the fact that the ink orifices for producing the jetted ink droplets are arrayed at a high density. Among these, a recording head that uses the electrothermal transducer as the energy generating source lends itself to a reduction in size. In addition, such a recording head makes it possible to fully exploit the advantages of IC and micromachining techniques that are highly reliable and use the advances that have recently been made in the semiconductor field. Such a recording head makes it possible to realize high-density mounting and a reduction in manufacturing cost.

When one line of printing is finished by the scanning of the printing head 1, the printing paper 18 is transported one line in the transport direction of arrow a, which is shown above the printing paper 18 in FIG. 3, by the paper feed motor 20, after which the printing head 1 prints the next line. This operation is performed in successive fashion.

The automatic paper supply unit 19 separates plural sheets of the printing paper or documents 18 or white reference sheets 400 into individual sheets one at a time and transports them toward the paper feed roller 14 one by one.

[Scanner Function]

The data reading apparatus of this embodiment will be described in terms of the function of a scanner.

When the scanner head 300 is fitted onto the carrier 2, a CPU 502 shown in FIG. 5 and described later effects a transition to a scanner mode upon reading a printing head/scanner head recognition signal via a scanner driver 513. In a manner similar to the printing paper described above, the document 18 (or the white reference sheet 400) to be read is transported to a predetermined position by the automatic paper supply unit 19 and paper feed motor 20. While the carrier motor 6 is being driven, color data, image data, white reference data and the like are read from the document 18 or white reference sheet 400 via the scanner driver 513.

When the reading of one line of an image on the document is finished, the document is transported one line by the paper feed motor 20 and then next line is then read. This operation is performed successively for the entire image on the document. In the case of the white reference sheet 400, the sheet is discharged after the white reference data has been obtained.

A cap 13 for protecting the ink orifices of the printing head 1 against drying is provided on the frame 25 close to one end of the traveling path of carrier 2. When the carrier 2 is situated at the home position, the cap 13 is pressed against the printing head 1 by a power transmission mechanism (not shown) through use of the paper feed motor 20. An ink sucking operation for cleaning the ink orifices also is carried out by the cap 13. A blade 12 for wiping off the surfaces of the ink orifices of the printing head 1 is located on the side of the cap 13. The surfaces of the ink orifices are wiped clean by a link mechanism (not shown) through operation of the carrier 2. By virtue of this operation, foreign matter such as dust that has attached itself to the nozzles of the ink orifices is removed so that normal recording can be carried out. This is referred to as a wiping operation. The scanner head 300 is situated at positions spaced away from the side faces of the cap 13 and blade 12 so that the scanner head 300 will not contact the cap 13 and blade 12 if the capping operation or wiping operation is carried out in a state in which the scanner head 300 is mounted on the carrier 2.

[Electrical Circuitry for Implementing Printer Function]

Figure 5:
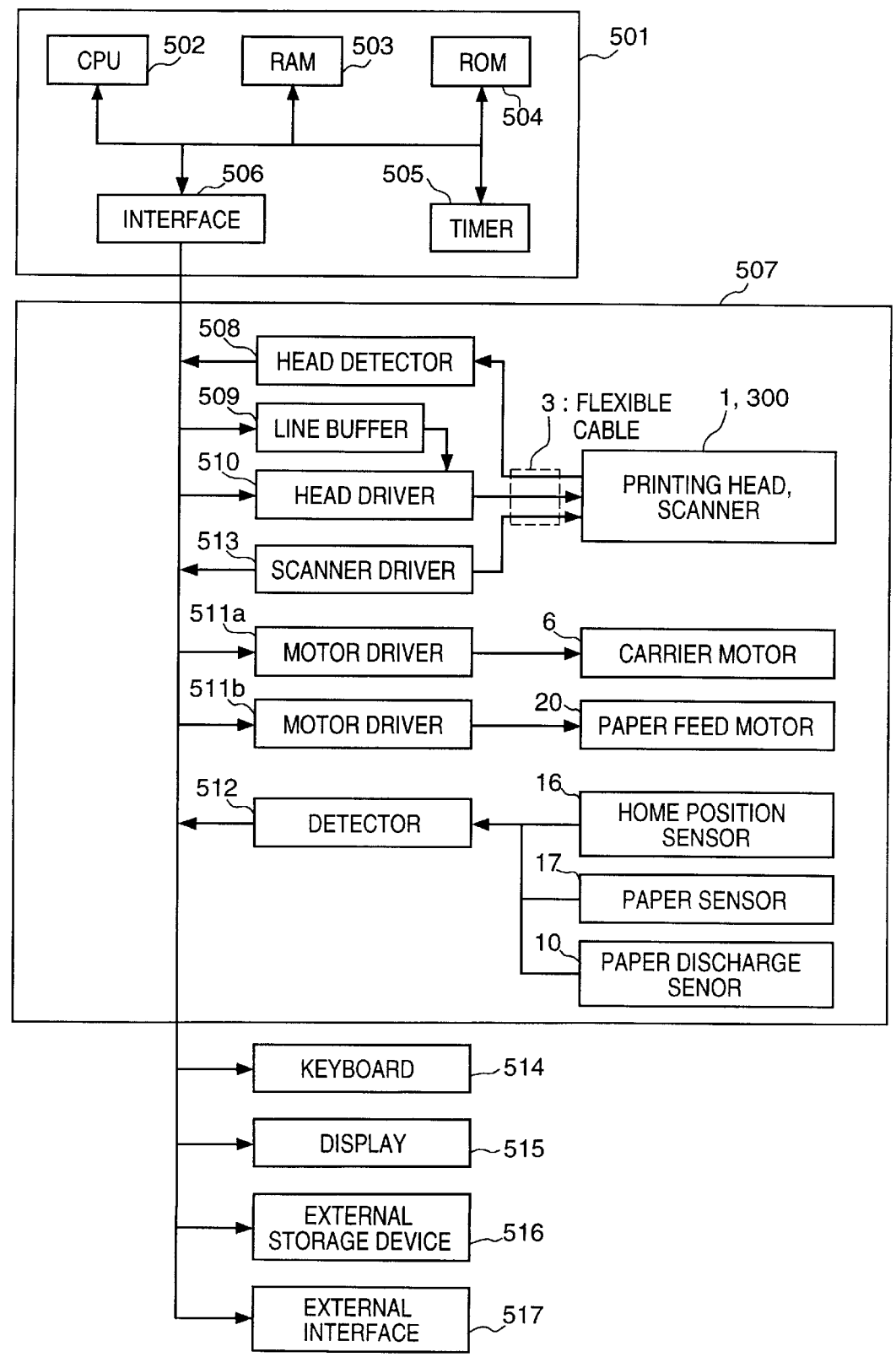
FIG. 5 is a block diagram showing an electric circuit of a printer.

FIG. 5 is a block diagram illustrating the electrical circuitry for implementing the printer function of the data reading apparatus according to this embodiment.

A controller 501 for controlling the overall apparatus includes a CPU 502 such as a microcomputer for executing various processing, a RAM 503 provided with an area for developing text data or image data and with a working area, a ROM 504 storing programs corresponding to the various processing operations as well as fixed data such as font data, a timer 505 for creating execution cycles of the CPU 502 and generating timings necessary for the recording operation when the apparatus operates as a printer, and an interface 506 connecting control signals, which are output by the CPU 502, to peripheral equipment.

A controller 507 controls the printer function and scanner function and includes a head detector 508 for detecting recording head information such as the absence or presence and type of printing head 1 and scanner head 300, the output value of a sensor for sensing the temperature of the printing head 1 and the output of a sensor for sensing whether ink is present or not in the printing head 1, a line buffer 509 for storing recording data of the printing head 1, a head driver 510 for sending a recording signal or power to the printing head 1, motor drivers 511a, 511b for outputting electric signals and power necessary to drive the carrier motor 6 and paper feed motor 20, and a detector 512 for detecting outputs from such sensors as the home position sensor 16, paper sensor 17 and paper discharge sensor 10. A scanner driver 513 is used when the scanner head 300 is mounted instead of the printing head 1. The flexible cable 3 is used for both the sending and receiving of signals between the head detector 508 and head driver 510 and the sending and receiving of signals between the scanner driver 513 and scanner head 300.

A keyboard 514 is for entering instructions and text, a display unit 515 displays status, and an external storage device 516 is a floppy disk drive, hard disk drive or RAM card, by way of example. An external interface 517 is for communicating with other information processors, for example, and for controlling peripheral equipment by being connected directly to an internal bus. Though not included in the block diagram of FIG. 5, a power source is provided to supply power to the above-described electrical circuitry. The power source may be a rechargeable battery, a disposable dry cell or, if the apparatus is used upon being permanently installed, a converter for an AC power supply.

[Details of Scanner Head Construction]

The details of construction of the scanner head 300 will be described with reference to FIGS. 6A, 6B.

Figure 6:
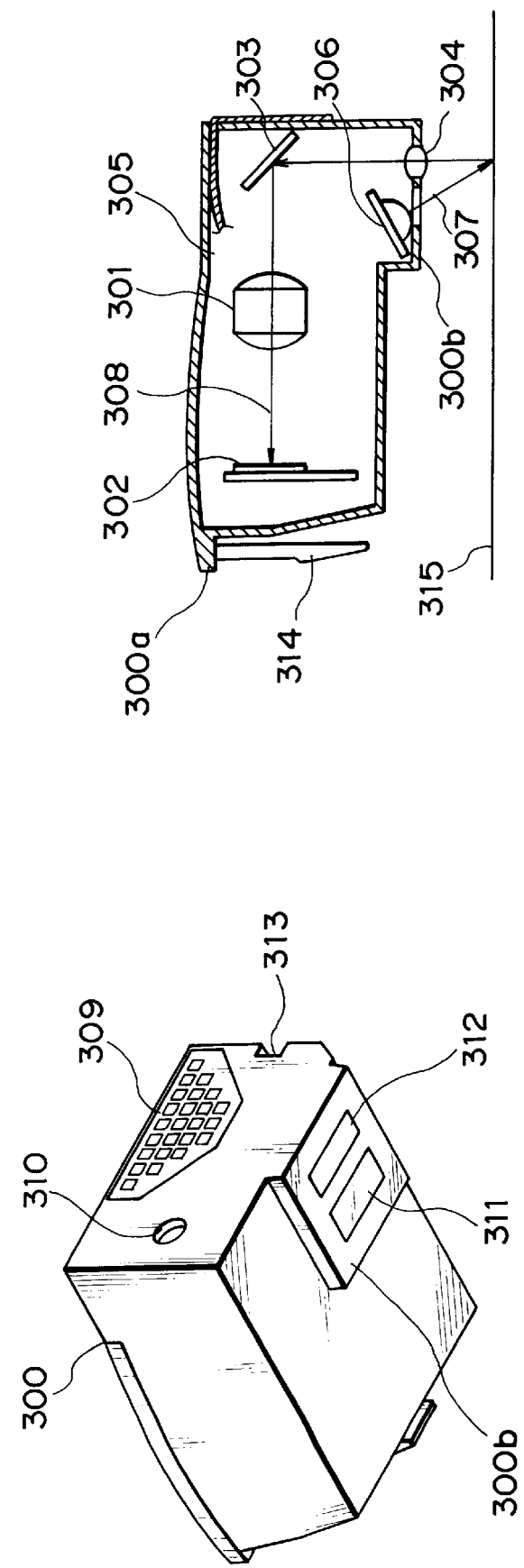
FIG. 6A is a perspective view of a scanner head.
FIG. 6B is a side section of FIG. 6A.

As shown in FIGS. 6A, 6B, an LED 306 illuminates the surface 315 of a document. The LED 306 is a three-color (red, green, blue) LED to make possible the reading of color documents.

The LED 306 emits LED light 307, which illuminates the document surface 315 through an LED opening 311. Image light 308 from the document surface 315 passes through a field lens 304, which is provided in the sensor opening 312, the optical path of the light is bent at right angles by a mirror 303, and an image is formed on the sensor 302 through an image forming lens 301. In this embodiment, a 128-pixel linear image sensor is used as the sensor 302.

The LED 306 and sensor 302 are electrically connected and led out to the exterior by a circuit board 305. Electrodes are formed on a head terminal portion 309 of the circuit board 305. These electrodes are brought into pressured contact with electrodes on the carrier 2 (not shown in FIGS. 6A, 6B) so that electric signals can be introduced to the control circuitry on the side of the main unit.

The scanner head 300 has an external shape approximately the same as that of a recording head cartridge and can be fitted onto the carrier 2 by the latch of a pawl portion 314, which is part of the housing. The scanner head 300 is fitted on the carrier 2 using a positioning hole 310 and a positioning notch 313 as references in the same manner as the printing head 1. To detach the scanner head 300 from the carrier 2, a head manipulating portion 300a is lifted up, whereupon the latch of pawl 314 is disengaged so that the scanner head 300 can be taken off in simple fashion.

When the scanner head 300 is fitted onto the carrier 2, the CPU 502 reads a printing head/scanner head recognition signal from the circuit board 305 via the scanner driver 513 and responds by establishing the scanner mode.

When a reading start signal enters the CPU 502 from a running application, the keyboard 514 or the external interface 517, the CPU 502 drives the automatic paper supply unit 19 and the paper feed motor 20 to transport the document 18 to the predetermined position in the same manner as the printing paper was. The CPU 502 causes the LED 306 to light, after which the image on the document is read via the scanner driver 513 while the carrier motor 6 is being driven.

In the mode for reading the document using the scanner head 300, the speed at which the carrier motor 6 is driven can be changed. The particular mode for reading the document is decided based upon the combination of reading resolution and tones of the read values. If printer resolution is 360 dpi in the main-scan direction and the resolution of the sensor 302 of scanner head 300 is 360 dpi (dot per inch) in the sub-scan direction, then a 64-tone image can be read. Accordingly, and by way of example, modes that can be set include a 64-tone reading mode using 360 dpi in the main-scan direction and 360 dpi in the sub-scan direction, a two-tone reading mode using 90 dpi in the main-scan direction and 90 dpi in the sub-scan direction, a reading mode using 200 dpi in the main-scan direction, and a mode that takes coordination with a facsimile machine into account.

In a mode involving a large quantity of data, as in the 64-tone reading mode using 360 dpi in the main-scan direction and 360 dpi in the sub-scan direction, the speed at which the carrier is driven is reduced because data processing and transfer take time. Conversely, in the two-tone reading mode using 90 dpi in the main-scan direction and 90 dpi in the sub-scan direction, carrier driving speed can be increased. In order to read a color document, the above-described operation should be repeated three times, namely once for each of the colors of the three-color LED.

When the reading of one line of the document is finished, the document is transported one line by the paper feed motor 20, whereupon the next line is read. This operation is carried out until the reading of the entire document is completed.

The standby position of the carrier 2 when the scanner head 300 is mounted on the carrier is not required to be the same as the carrier position when the printing head 1 is mounted. If the reading surface 300b of the scanner head 300 is shaped to avoid the recovery portion (the blade 12 and cap 13) that maintains the printing head 1, the standby position may be shifted to the side of the recovery portion and the interval over which movement is possible may be used as a free running section for improving the traveling stability of the carrier 2.

The white reference sheet 400 used in this embodiment is a sheet having a reference reflectivity of less than 0.1 in terms of reflection density. In order to compensate for variances in sensitivity and amount of light received by the pixels of the sensor 302, it is necessary to read in the white reference sheet 400 under conditions identical with the conditions under which the document is read and partition, into a desired number of tones, the difference between the obtained white reference signal of each sensor pixel and a signal (black reference) obtained when the sensor is not receiving light, thereby obtaining tones in which variance from one sensor pixel to the next has been eliminated.

After the white reference sheet 400 has been supplied to the processing section in the same manner as the printing paper or document 18, the white reference sheet 400 is halted in the state shown in FIG. 3. Next, the CPU 502 causes the carrier 2 having the mounted scanner head 300 to move to a point above the white reference sheet 400, after which the CPU 502 causes the LED 306 to light so that the signal from the sensor 302 is read. This signal is adopted as the reference of the image signal. After this white reference data is read, the white reference sheet 400 is discharged from the apparatus.

[Electrical Circuitry of Scanner Head]

Figure 7:
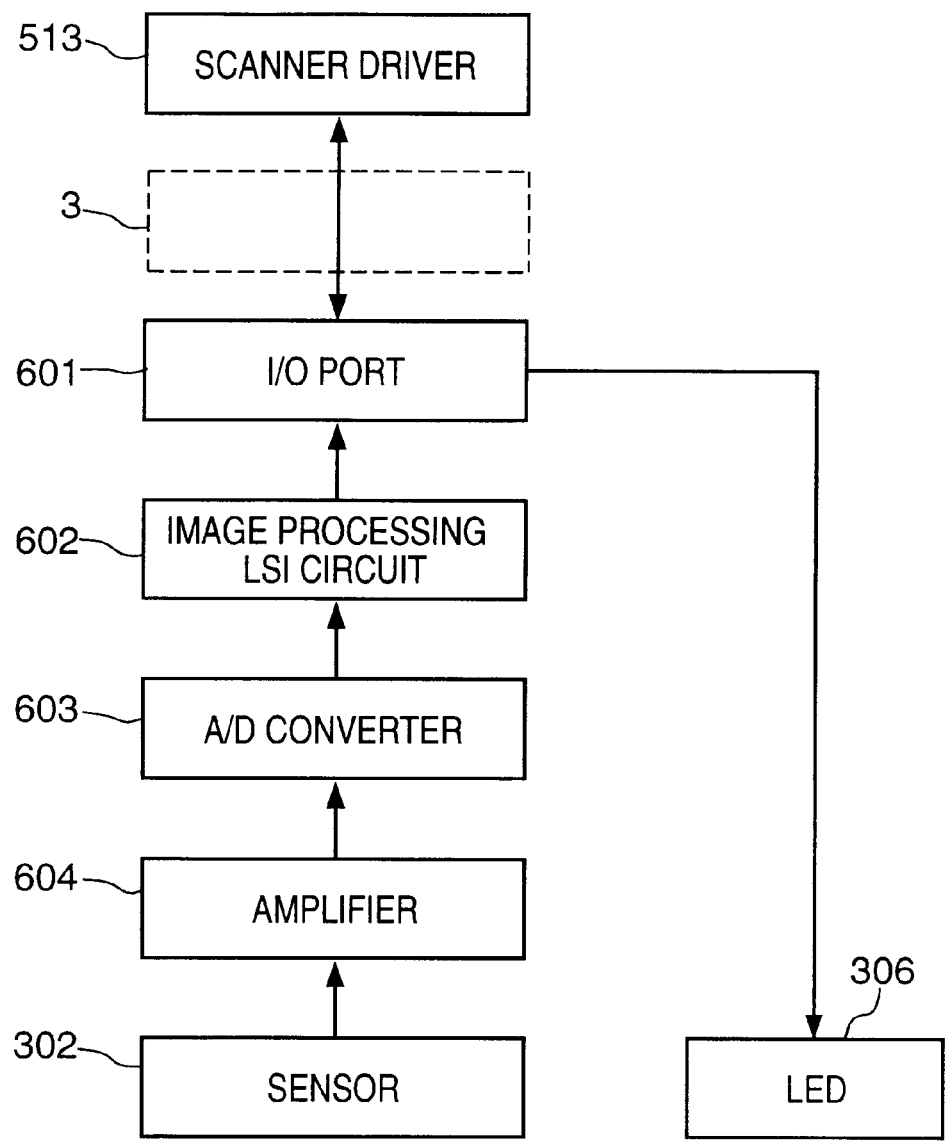
FIG. 7 is a block diagram showing an electric circuit of the scanner head.

The electrical circuitry constituting the scanner head will be described with reference to FIG. 7.

When the scanner head 300 is mounted on the carrier 2, the head terminal portion 309 of the scanner head 300 is brought into pressured contact with terminals (not shown) formed on the flexible cable 3 wired to the carrier 2. The scanner head 300 is thus coupled to the controller 507.

The controller 507 illustrated in FIG. 5 communicates data and commands in two directions via the scanner driver 513. Further, the scanner head 300 communicates data and commands in two directions via an I/O portion 601.

The image light 308 from the document 18 illuminated by the LED 306 is sensed as image data by the sensor 302, which possesses a photoelectric conversion characteristic. The signal sensed by the sensor 302 is amplified, by an amplifier 604, to an optimum level handled by an A/D converter 603 and then inputs the amplified signal to the A/D converter 603. After the amplified signal is converted to digital data by the A/D converter 603, the digital data is subjected to a shading correction, binarization correction and other image processing by an image processing LSI circuit 602. The data thus processed is transferred to the controller 507 via the flexible cable 3.

The white reference data of each pixel of the sensor 302 obtained from the white reference sheet 400 is stored in a register within the image processing LSI circuit 602 and is used in various processing.

A white reference data acquisition procedure based upon the data reading apparatus of the present invention, namely a procedure for deciding the white reference data of each pixel of sensor 302, will be described with reference to the flowchart of FIG. 2 taking into account the structure and operation set forth above.

Figure 2:
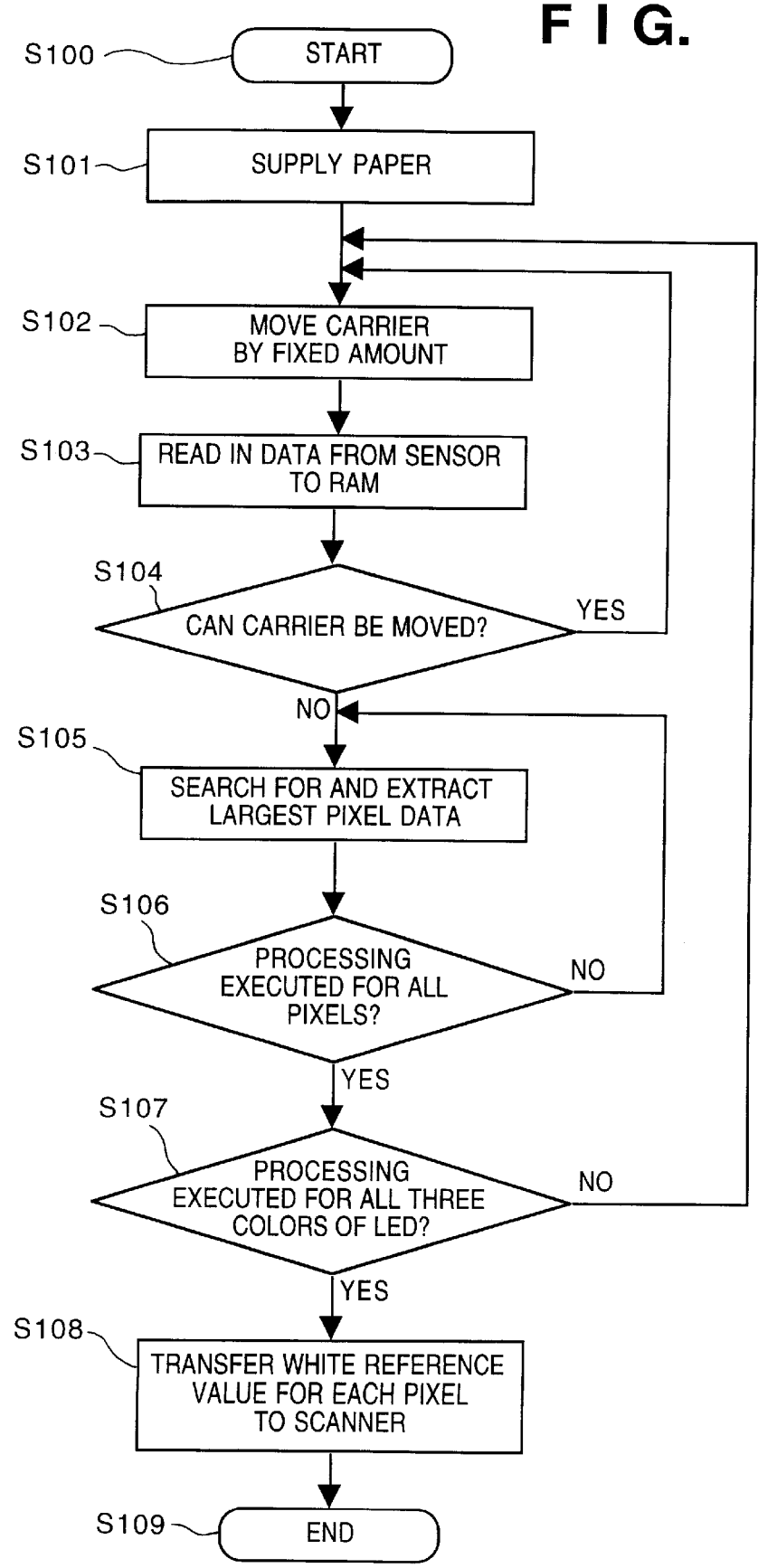
FIG. 2 is a flowchart illustrating a reading operation performed by a data reading apparatus according to an embodiment of the present invention.

When processing is started at step S100 in FIG. 2, the white reference sheet 400 is supplied by the automatic paper supply unit 19 at step S101 and is held in the state shown in FIG. 4.

Next, at step S102, the CPU 502 causes the carrier 2 to be moved in the direction of arrow b in FIG. 3 from the initial position (the location of the cap 13) by driving the carrier motor 6.

Next, at step S103, the CPU 502 reads the converted digital data, which has been obtained from the sensor 302, into the RAM 503 in synchronization with the prescribed amount of movement (e.g., 180 dpi=0.1411 mm) of the carrier 2 while the LED 306 is being lit.

This is followed by step S104, at which the CPU 502 sets the amount (A) of carrier movement to satisfy the following condition in such a manner that it will not matter where the user supplies the white reference sheet 400 between the guide 32 and the guide 33 and in such a manner that an unsoiled location on the white reference sheet 400 will be read in:

$$D > A \geq D - C + B$$

where B represents the amount of movement required for the scanner head 300, which has been mounted on the carrier 2, to read one item of white reference data, C represents the width of the white reference sheet in the traveling direction of the carrier, and D represents the width within which the document can be placed.

Figure 1:
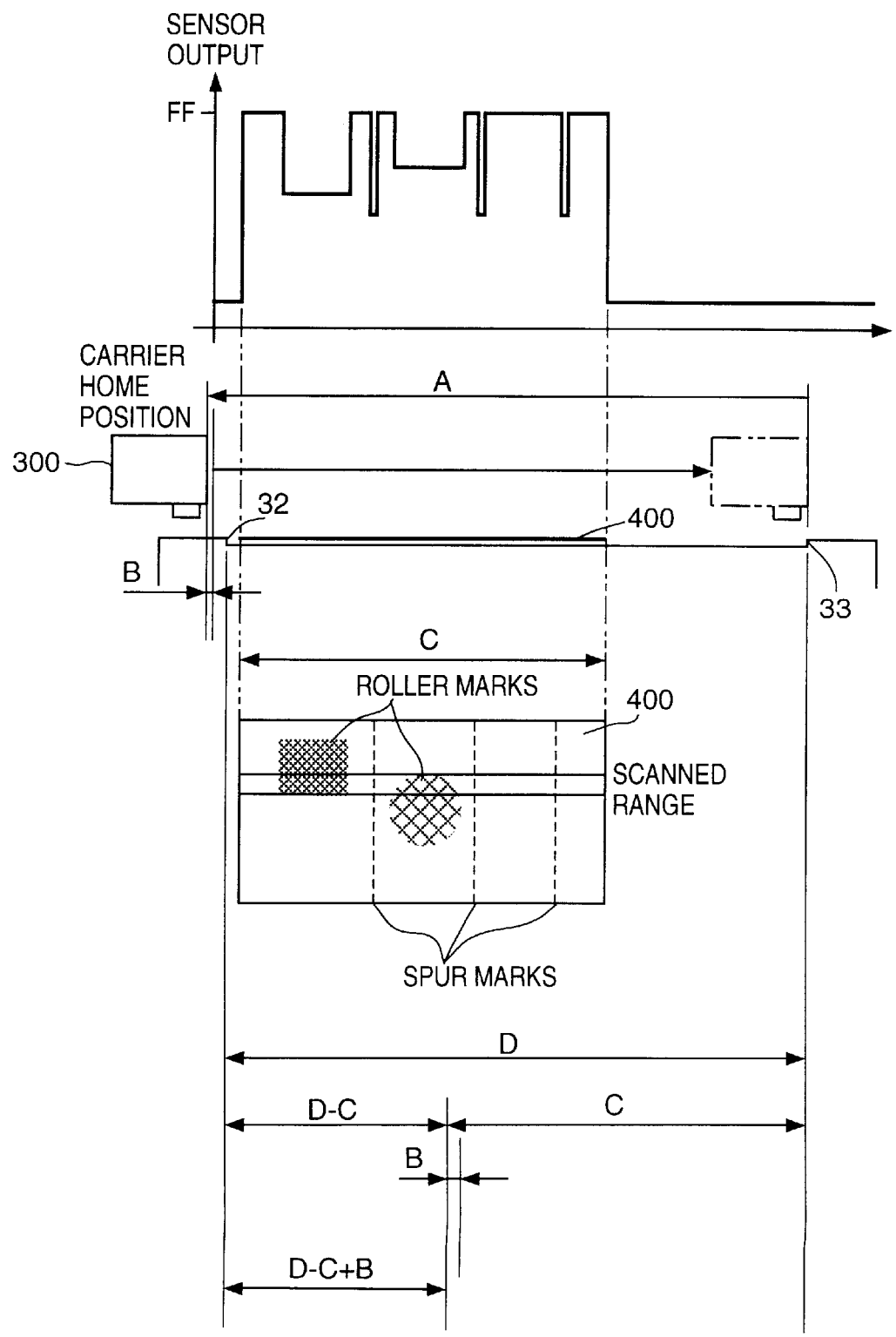
FIG. 1 is a diagram useful in describing the output state of a sensor when white reference data is read from a white reference sheet.

A soiled portion of the white reference sheet exhibits reduced reflectivity, and scratches on the surface of the white reference sheet cause reflected light to be scattered. In any case, the light received by the sensor 302 is reduced. Assume that a value obtained when a completely unsoiled white reference sheet is read is adopted as the reference. If a soiled portion of the white reference sheet is read (such as a portion having a mark left by traversal of the paper supply roller or spur in FIG. 1), the value obtained declines by an amount commensurate with the amount of soiling. In such case a change in the output of the sensor 302 is as shown in FIG. 1, in which attention is drawn to one pixel among a plurality of pixels.

Further, reading is performed to the extent that the amount A of carrier travel satisfies the condition set forth above. This means that there is a possibility that reading will be performed even at locations where the white reference sheet 400 is not present. However, if the value obtained by reading in such case is compared with the value obtained by reading the white reference sheet 400, the former value will be smaller.

Step S105 is executed next. With respect to the data obtained as mentioned above, the larger the value, the whiter the location being read, i.e., the less soiled the read location on the white reference sheet 400. The CPU 502 therefore searches for the maximum value among 1440 items of data obtained for each of the pixels and adopts the maximum value as the white reference data for the particular pixel.

If it is determined at step S106 that the above-mentioned processing of step S105 has been executed for all 128 pixels, then the processing of steps S102~S106 is repeated for each of the three colors.

The 128 pixels of three-color white reference data obtained are transferred to a register within the image processing LSI circuit 602 in the scanner head 300 at step S108. This series of processing steps is terminated at step S109.

According to this embodiment, color printing is possible when the apparatus is used as a printer. Hence there is the possibility that the white reference sheet will be soiled not only by black ink but by inks of other colors (cyan, magenta, yellow) as well. Further, reflectivity at a location on the white reference sheet soiled by color ink differs for each of the there colors (red, green, blue) used for reading color. Accordingly, there is the danger that accepting three-color white reference data at the same position will result in the wrong value being read in. However, if the operation for extracting the maximum value of the white reference data read in individually for each color is performed in accordance with the above-described technique, then the white reference data best suited for each color can be acquired.

Thus, in accordance with this embodiment of the present invention, regardless of where the white reference sheet is supplied in the paper supply passageway, white reference data can be obtained reliably at all times by moving the carrier appropriately. This makes it unnecessary for the user to perform the troublesome task of supplying the white reference sheet to the same position at all times.

Further, this embodiment is particularly effective in a case where a printing head and a scanner head are capable of being alternately mounted on a single carrier to selectively enable printing and reading and in a case where the ink-jet method is adopted for printing.

Note that a reference data, for example, a black reference data other than a white reference data may be obtained by using a reference sheet except for a white reference sheet, although the case used a white reference sheet is explained in this embodiment.

Also, a carrier that installed a scanner head can be moved in the second direction (sub-scanning direction) relatively in condition that an original or a white reference sheet are fixed, although it is composed as an document or a white reference sheet are conveyed in this embodiment.

Further, both of a carrier and a reference sheet may be moved simultaneously.

[Other Embodiments]

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing program codes for performing the aforesaid functions of the foregoing embodiment to a system or an apparatus, reading the program codes with a computer (e.g., a CPU or MPU) of the system or apparatus from the storage medium, and then executing the program.

In this case, the program codes read from the storage medium implement the functions according to the embodiment, and the storage medium storing the program codes constitutes the invention.

The storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system or the like working on the computer performs a part of or the entire process in accordance with the designation of program codes and implements the functions according to the embodiment.

Furthermore, it goes without saying that the present invention further covers a case where, after the program codes read from the storage medium are written to a function extension board inserted into the computer or to a memory provided in a function extension unit connected to the computer, a CPU or the like contained in the function extension board or function extension unit performs a part of or the entire process in accordance with the designation of program codes and implements the function of the above embodiments.

In a case where the present invention is applied to the above-mentioned storage medium, program codes corresponding to the above-described flowchart of FIG. 2 would be stored on the storage medium.

As many apparently widely different embodiments of the present invention can be made without departing from the spirit and scope thereof, it is to be understood that the invention is not limited to the specific embodiments thereof except as defined in the appended claims.

What is claimed is:

1. A data reading apparatus comprising:
   carrier means for mounting a scanner head which optically reads a document, said carrier means being provided so as to be capable of moving back and forth relative to the document in a first direction;
   transport means for transporting the document in a second direction that is perpendicular to the first direction; and
   control means for controlling movement of said carrier means in such a manner that an amount (A) of movement of said carrier means in the first direction will satisfy the following condition:

$$D > A \geq D - C + B$$

when a reference document is read by said scanner head, the reference document is transported by said transport means, where B represents amount of movement of said carrier means required for said scanner head to read one item of reference data, C represents width of the reference document in the first direction, and D represents a width within which an original document can be placed.

2. The apparatus according to claim 1, wherein said carrier means is capable of selectively mounting said scanner head and a recording head which prints data on a medium.

3. The apparatus according to claim 1, further comprising white data acquisition means for acquiring, through use of said scanner head, white reference data from a white reference sheet having a predetermined reflectivity, said white reference sheet serving as the reference document.

4. The apparatus according to claim 2, wherein said carrier means mounts an ink-jet recording head.

5. The apparatus according to claim 1, wherein the width C of the reference document in the first direction is less than maximum width of the original document that can be read by the scanner head.

6. A method of reading data in a data reading apparatus having carrier means for mounting a scanner head which optically reads a document, said carrier means being provided so as to be capable of moving back and forth relative to the document in a first direction, and transport means for transporting the document in a second direction that is perpendicular to the first direction, said method comprising a step of controlling movement of said carrier means in such a manner that an amount (A) of movement of said carrier means in the first direction will satisfy the following condition:

$$D > A \geq D - C + B$$

when a reference document is read by said scanner head, the reference document is transported by said transport means, where B represents amount of movement of said carrier means required for scanner head to read one item of reference data, C represents width of the reference document in the first direction, and D represents a width within which an original document can be placed.

7. The method according to claim 6, wherein said carrier means is capable of selectively mounting said scanner head and a recording head which prints data on a medium.

8. The method according to claim 6, further comprising white data acquisition means for acquiring, through use of said scanner head, white reference data from a white reference sheet having a predetermined reflectivity, said white reference sheet serving as the reference document.

9. The method according to claim 7, wherein said carrier means mounts an ink-jet recording head.

10. The method according to claim 6, wherein the width C of the reference document in the first direction is less than maximum width of the original document that can be read by the scanner head.

* * * * *

UNITED STATES PATENT AND TRADEMARK OFFICE
CERTIFICATE OF CORRECTION

PATENT NO. : 6,134,026
DATED : October 17, 2000
INVENTOR(S) : Toshihide Wada

It is certified that error appears in the above-identified patent and that said Letters Patent is hereby corrected as shown below:

<u>Title page,</u>
Item [57], ABSTRACT,
Line 6, "D>A≧D-C+B" should read -- D>A≥D-C+B --.

<u>Column 3,</u>
Line 5, "arrow a" should read -- arrow <u>a</u> --.
Line 9, "arrow b" should read -- arrow <u>b</u> --.
Line 18, "arrow b." should read -- arrow <u>b</u>. --.
Line 38, "arrow a" should read -- arrow <u>a</u> --.
Lines 40-41, "arrow a" should read -- arrow <u>a</u> --.

<u>Column 4,</u>
Line 32, "arrow a," should read -- arrow <u>a</u>, --.

<u>Column 8,</u>
Line 10, "arrow b" should read -- arrow <u>b</u> --.
Line 27, "D>A≧D-C+B" should read -- D>A≥D-C+B --.

<u>Column 10,</u>
Line 34, "D>A≧D-C+B" should read -- D>A≥D-C+B --.

<u>Column 11,</u>
Line 1, "D>A≧D-C+B" should read -- D>A≥D-C+B --.

Signed and Sealed this

Sixth Day of August, 2002

*Attest:*

*Attesting Officer*

JAMES E. ROGAN
*Director of the United States Patent and Trademark Office*